Feb. 25, 1936.  H. BROOKS  2,032,251

POTATO PLANTER

Filed May 15, 1935  3 Sheets-Sheet 1

Henry Brooks
INVENTOR

BY Victor J. Evans & Co.
ATTORNEY

Feb. 25, 1936.                H. BROOKS                2,032,251
                            POTATO PLANTER
                         Filed May 15, 1935          3 Sheets-Sheet 2
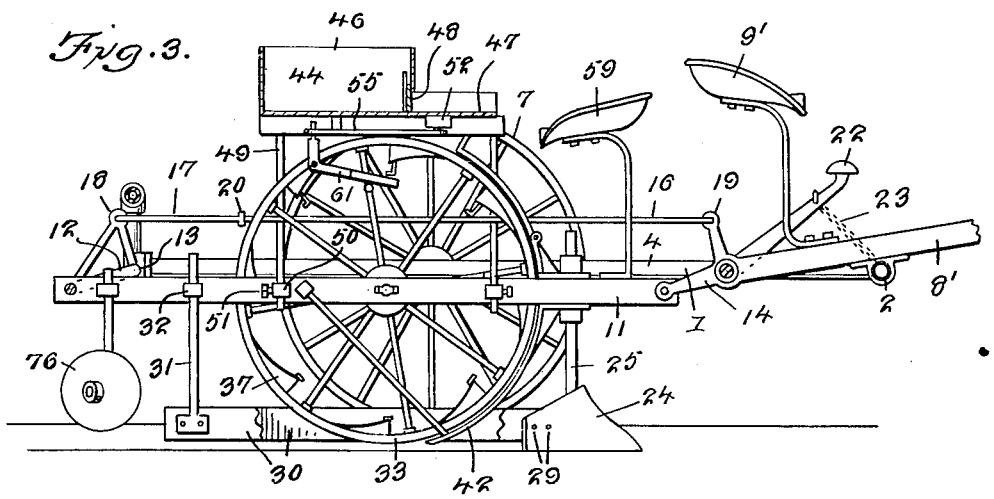
Henry Brooks
INVENTOR
BY Victor J. Evans & Co.
ATTORNEY

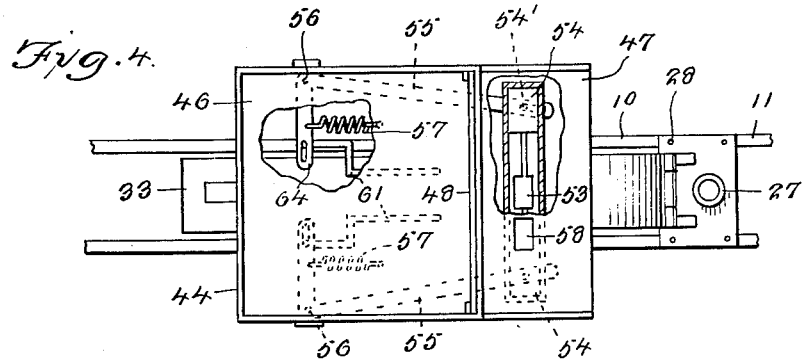
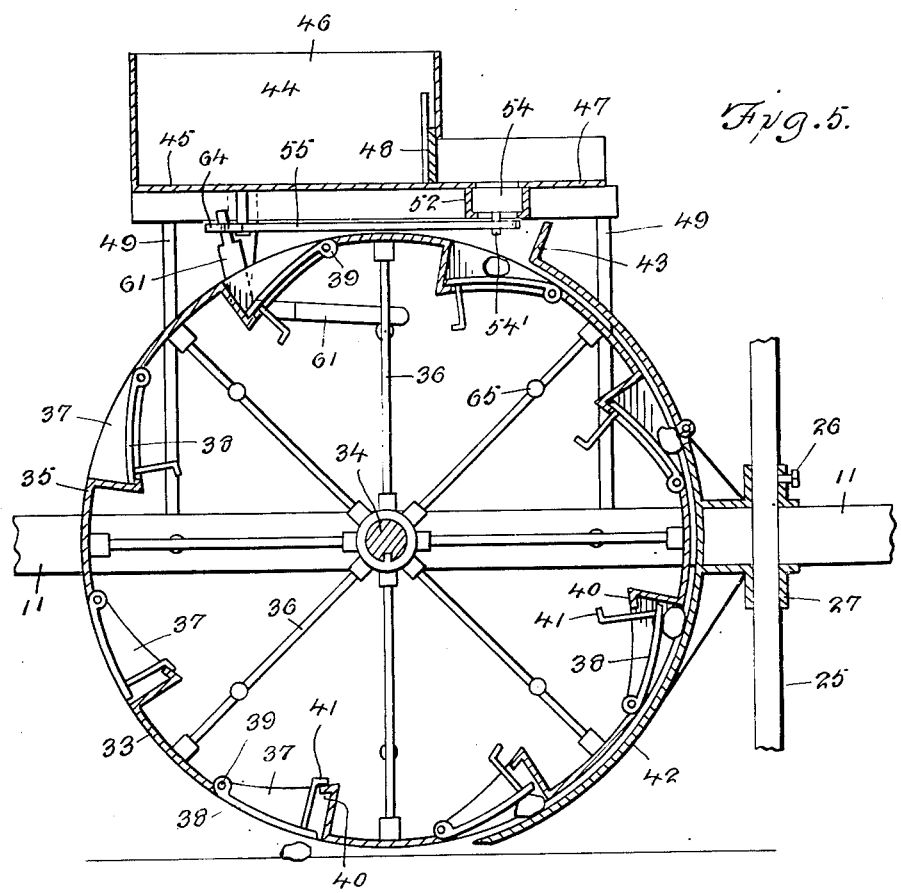

Patented Feb. 25, 1936

2,032,251

UNITED STATES PATENT OFFICE 2,032,251

POTATO PLANTER

Henry Brooks, Forest Junction, Wis.

Application May 15, 1935, Serial No. 21,629

6 Claims. (Cl. 111—59)

My invention relates to improvements in agricultural machines and more particularly to potato planting implements.

The principal object of my invention is to provide an efficient machine for digging a furrow, depositing potatoes therein at equidistantly spaced intervals, and subsequently filling in the furrow to cover the potatoes planted therein.

Another object of my invention is to provide a machine for the above designated purposes and which is particularly adapted for planting the potatoes at different depths.

Another object of my invention is to provide in a machine of this character a plowing unit and a planting unit and readily operative means for adjusting said units to different set positions to selectively vary the depth of the furrow and the depth at which potatoes are planted.

Other, and subordinate, objects are also comprehended by my invention as will presently appear when the following description and claims are read in conjunction with the accompanying drawings.

In said drawings:

Figure 3 is a view in longitudinal vertical section.

Figure 4 is a fragmentary view in top plan with parts broken away and shown in section.

Figure 5 is a vertical transverse sectional view, taken on the line 5—5 of Figure 2.

Figure 6 is a fragmentary view in transverse section, taken on the line 6—6 of Figure 2, and Figure 7 is a similar view with the parts shown in different positions.

Figure 1:
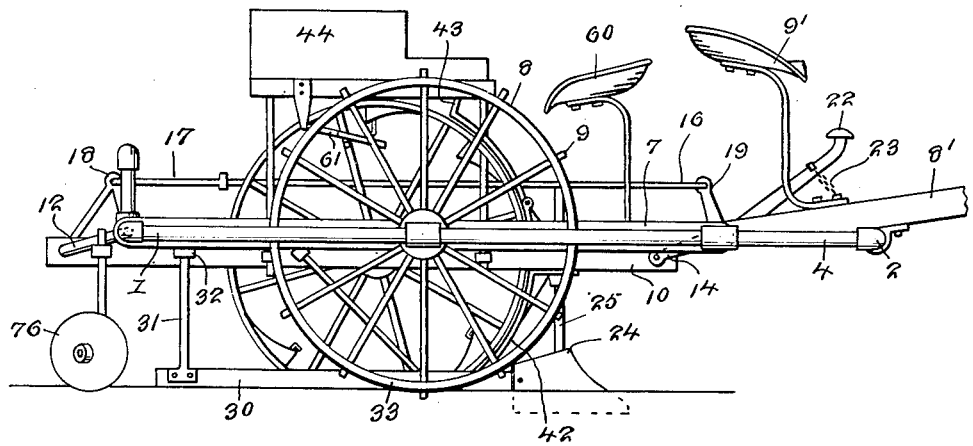
Figure 1 is a view in side elevation of a potato planting implement constructed according to my invention.
Figure 2:
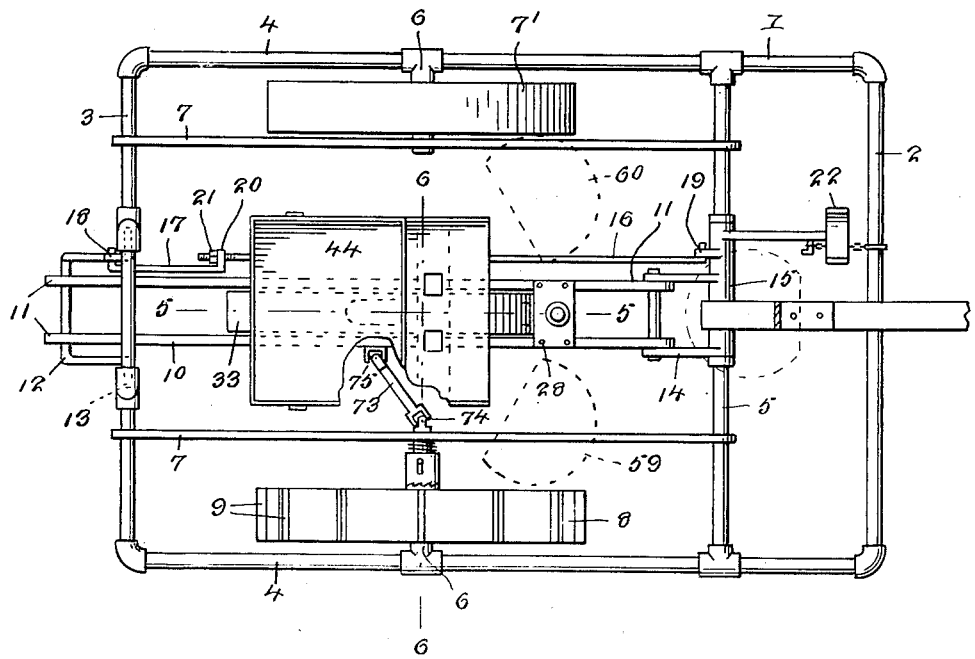
Figure 2 is a view in top plan drawn to an enlarged scale.

Reference being had to the drawings, my invention in its preferred embodiment comprises a main frame 1, preferably rectangular and formed of tubular material, and comprising a front end member 2, a rear end member 3, side members 4, and a transverse member 5 adjacent the front of said frame and for a purpose presently seen. Extending inwardly from the side members 3 are short axle members 6 having their inner ends mounted in bars 7, fixed at their ends to the transverse member 5 and the rear member 3 parallel to the side members 4. Ground wheels 7' and 8 are rotatably mounted on said axles, one wheel 8 being provided with cleats 9 and constituting a drive wheel for mechanism presently described. A draft tongue 8' is secured in any suitable manner to the front and transverse frame bars 2 and 5 and a driver's seat 9' is mounted on said tongue.

Extending longitudinally of the main frame 1 and located centrally thereof is a vertically adjustable frame 10 having the form of parallel link motion devices comprising laterally spaced horizontal bars 11 having their rear ends pivotally mounted upon a crank yoke 12 pivoted, as at 13, on the rear member 3 for vertical swinging movement. The front ends of said bars 11 are similarly mounted on a crank yoke 14 including a sleeve 15 by means of which said yoke is mounted for vertical swinging movement on the transverse member 5. Coupling rods 16 and 17 connected to crank arms 18 and 19 on said yokes 12 and 14, respectively, connect the latter together for swinging movement in unison. The coupling rods 16 and 17 are connected to each other, one passing through an ear 20 on the other and being provided with a nut 21, so that the yokes 12 and 14 may be relatively adjusted to adjust the bars 11 for a purpose presently clear. A vertically movable foot lever 22 is provided on the sleeve 15, adjacent the seat 9' for swinging the frame bars 11 upward. A chain 23 suitably connected to said lever and to the end member 2 secures the lever in desired positions.

The described parallel link motion frame 10 supports, adjacent its front end, a plow member 24 secured to the lower end of a share member 25 adjustably mounted as by bolt 26 in a sleeve casting 27 bolted as at 28 to said bars 11. Secured, as at 29, to the plow member 24 are rearwardly extending laterally spaced guard plates 30 adapted to travel in the furrow to keep the ground from falling back into the latter. At their rear ends the plates 30 are braced by upright supports 31 secured, as at 32, to the bars 11.

In the rear of the plow member 24, and intermediate the bars 11 and plates 30, is a potato dropping or depositing wheel 33 fast upon a shaft 34 journaled at its opposite ends in the bars 11. The wheel 33 comprises a rim 35 and spokes 36, the former provided with equidistantly spaced pockets alternating with the spokes 36 and opening on to the rim 35. A curved flap 38 is hinged at one end, as at 39, in each pocket 37 for gravitational movement in opposite directions to form the bottom of the pocket when the latter is at the top of the wheel and to force the contents of the pocket therefrom as said pocket nears the ground. A lip 40 on each pocket 37 limits movement of the flap 38 in one direction. An angular stop member 41 on said flap with said lip 40 limits movement of said flap in the opposite direction. A segmental metal guard plate 42, curved concentrically with the wheel 33 and preferably integral with the sleeve casting 27, is supported by the latter in front of the wheel 33 slightly clear of the rim 35. The guard 42 is designed to cover the pockets 37 and retain potatoes therein while said pockets pass from substantially their uppermost to their lowermost positions. At its upper end the guard 42 is formed with an upturned lip 43 for preventing potatoes deposited in a pocket 37 from being thrown over said guard by rotation of the wheel 33. Surmounting the wheel 33 is a storage hopper 34, the bottom wall 45, and the side walls 46 of which extend in front of said hopper and form a tray 47 open at its front. A vertically sliding gate 48 between said hopper and tray permits potatoes to pass from the former on to the latter. The hopper 44 and tray 47 are supported on the bars 11 by uprights 49 adjustably secured in ears 50 on said bars by set screws 51.

A feed box 52 is secured to the under side of the tray 47 to extend transversely of the wheel 33. The box 45 is provided in its bottom wall with a centrally disposed feeding aperture 53 located over the path of movement of the pockets 37. A pair of ejector plungers are disposed in said box for reciprocating movement toward and from said aperture 53, the ends of the box limiting movement of the plungers in the latter direction. Normally said plungers, 54, are yieldingly held against the ends of the box 53 by a pair of bell cranks 55 pivoted, as at 56, to the bottom of the hopper 46 upon opposite sides of the wheel 33, respectively, and tensioned by suitably connected springs 57 each bell crank being operatively connected to one of said plungers 54, as at 54', to move the same toward the aperture 53. A pair of apertures 58 are formed in the bottom of the tray 47 upon opposite sides of the aperture 53, respectively, for feeding potatoes into the box 52 in front of the plungers 54. A pair of rearwardly facing seats 59 and 60 are suitably mounted on the frame bars 11 from which attendants may drop potatoes into the apertures 58. The bell cranks 55 are operated in the direction to move the plungers toward said feed aperture 53 by a second pair of bell cranks 61, respectively, pivoted as at 62 upon brackets 63 depending from the hopper 44 upon opposite sides of the wheel 33. One arm of each bell crank 61 is operatively connected to its related bell crank 55 by projection through a slot 64 in the latter, the other arm thereof being offset toward the center of the wheel 33 for a purpose presently clear. The bell cranks 61 are operated alternately to correspondingly operate the plungers 54 by tappets 65 on the spokes 36 of the wheel 33 said tappets projecting from said spokes alternately on opposite sides of said wheel.

The wheel 33 is adapted to be driven by the ground wheel 8 by the following means. Axially aligned with the axle 6 of said wheel 8 is a spindle 66 rotatably and slidably mounted by its opposite ends in a hub 67 of said wheel 8 and in the adjacent bar 11. A clutch sleeve 68 is slidably mounted on said spindle 66, as by a pin 69, on said spindle projecting into a slot 70 in said sleeve. The sleeve 68 and spindle 66 are normally urged by spring 71 to engage said sleeve with a clutch sleeve 72 fast on the hub 67. A shaft 73 has its opposite ends connected to said spindle 66 and to the axle 34 of the wheel 33 by universal joints 74 and 75, respectively. The arrangement of the described drive between the wheel 8 and wheel 33 is such that the latter may be lowered into the furrow and engagement of the clutch sleeve 68 and 72 effected, or, said wheel 33 may be raised out of the furrow and said clutch sleeves disengaged by the pull of the shaft 73 against the spindle 66 as illustrated in Figure 7.

Suitable disc harrow members 76 mounted on the rear of the frame bars 11 in opposed angular relation cover the furrow in a manner which will be clear without further explanation.

Referring to the use of my invention, the parallel link motion frame 10 is adjusted vertically by operation of the foot lever 22 to adjust the plow member 24 in accordance with the depth of the furrow desired. This operation lowers the wheel 33 so that the same will fall in the furrow, the plates 30 preventing dirt from entering in the pockets 37 and from falling into the furrow. As the wheel 33 is lowered, the spindle 64 and sleeve 68 are moved by the spring 71 to effect engagement of the clutch sleeves 68 and 72 and thereby establish a driving relation between the wheels 8 and 33. As the machine is moved forwardly the potatoes are taken from the hopper 44 or tray 47 as the case may be and dropped through the apertures 53, alternately, into the feed box 52, in front of the plungers 54. As the wheel 33 is rotated the pockets 37 move successively beneath the feed box 52, the flaps 38 gravitating, as the pockets reach this position, to form a bottom for said pockets as shown in Figure 5. Coincidently with movement of a pocket 37 to a position beneath the aperture 53 one or the other of the plungers 54 is operated to drop a potato thereinto, by the bell cranks 55 and 61 and one of the tappets 65, in the manner previously described. As the loaded pocket moves forwardly, it is closed by the guard 42 until it reaches a position slightly in advance of the vertical axis of the wheel 33 at which point the pocket is uncovered and the flap permitted to gravitate downwardly so that the potato is deposited in the furrow as shown in Figure 5. The operation of the disc harrow members 66 to cover the furrow will be clear without explanation. When it is desired to transport the machine from place to place, the described frame 10 is elevated to a position in which the wheel 33 is well above the ground level and the clutch sleeves 68 and 72 disengaged in the manner previously described.

The foregoing constitutes a detailed description of a preferred embodiment of my invention, but it is to be understood that right is herein reserved to changes and modifications of the described details falling within the scope of the appended claims.

What I claim is:

1. A potato planting machine comprising a wheeled frame, a second frame mounted on the first mentioned frame for vertical swinging movement to different horizontal positions, a plow member on said second mentioned frame, a potato planting wheel mounted on said second frame for adjustment by swinging movement of the latter into and out of a furrow dug by said plow and having a relatively fixed axle, and driving connections between one of the frame wheels and said planting wheel rendered effective and ineffective by adjustment of the latter into and out of said furrow, respectively, said connections including a spindle slidable axially of said frame wheel, cooperating clutch members on said spindle and one wheel, respectively, and a universal shaft connection between said spindle and axle.

2. A potato planting machine comprising a wheeled frame, a second frame mounted in the first mentioned frame for vertical swinging movement to different horizontal positions, a plow member on said second frame, a potato planting wheel mounted on said second frame for adjustment by swinging movement of the latter into and out of a furrow dug by said plow and having a relatively fixed axle, and driving connections between one of the frame wheels and said planting wheel rendered effective and ineffective by adjustment of the latter into and out of said furrow, respectively, said connections including a spindle slidable axially of said frame wheel, cooperating clutch sleeves on said spindle and frame wheel, respectively, the sleeve on the spindle being splined and tensioned for movement toward said other sleeve, and a universal shaft connection between said spindle and axle.

3. A potato planting machine comprising a frame, a rotatable planting wheel mounted on said frame and provided in its rim with pockets spaced circumferentially thereof, a segmental guard fixed on said frame in front of said wheel for retaining the contents of said pockets therein as said pockets pass from substantially their uppermost to their lowermost positions on said wheel, and a gravity feed mechanism for depositing potatoes into said pockets and including a feed box extending transversally of said wheel and having a centrally located aperture in the bottom thereof, and means for feeding potatoes to said aperture alternately from opposite sides of said box and operative under control of said wheel.

4. A potato planting machine comprising a frame, a planting wheel rotatably mounted on said frame and provided in its rim with pockets spaced circumferentially thereof, a segmental guard fixed on said frame in front of said wheel for retaining the contents of said pockets thereon as said pockets pass from substantially their uppermost to their lowermost positions on said wheeel, and gravity feed mechanism for depositing potatoes into said pockets and including a feed box extending transversally of said wheel and having a centrally located aperture in the bottom thereof, and means for feeding potatoes from said aperture alternately from opposite sides of said box and comprising a pair of opposed plungers in said feed box disposed upon opposite sides of said aperture, respectively, bell cranks for operating said plungers, respectively, and tappets on said wheel operating said bell cranks alternately.

5. A potato planting machine including a wheeled frame, a parallel link motion frame mounted on said first mentioned frame, a plow member on the second mentioned frame and vertically and horizontally adjustable, thereby, for regulating the depth of a furrow dug by said plow, a potato planting wheel rotatably mounted on said second frame to travel in said furrow and adjustable by said second frame in correspondence with said plow said wheel being provided in the rim thereof with a plurality of circumferentially spaced pockets, a segmental guard fixed on said second frame in front of said wheel for retaining the contents of said pockets therein as the latter pass from substantially their uppermost to their lowermost positions on said wheel, a pair of guard plates extending from said plow along side the lower edges of said wheel, respectively, for preventing ground from falling back into said furrow and wheel, and a gravity feed mechanism mounted in the second frame for depositing potatoes into said box and including a feed box extending transversally of said wheel and having in its bottom wall a centrally located feed aperture, and means for feeding potatoes to said pockets alternately from opposite sides of said box and under control of said wheel.

6. A potato planting machine including a wheeled frame, a parallel link motion frame mounted on said first mentioned frame, a plow member on the second mentioned frame and vertically and horizontally adjustable, thereby, for regulating the depth of a furrow dug by said plow, a potato planting wheel rotatably mounted on said second frame to travel in said furrow and adjustable by said second frame in correspondence with said plow said wheel being provided in the rim thereof with a plurality of circumferentially spaced pockets, a segmental guard fixed on said second frame in front of said wheel for retaining the contents of said pockets therein as the latter pass from substantially their uppermost to their lowermost positions on said wheel. A pair of guard plates extending from said plow along side the lower edges of said wheel, respectively, for preventing ground from falling back into said furrow and wheel, and a gravity feed mechanism mounted in the second frame for depositing potatoes into said box and including a feed box extending transversally of said wheel and having in its bottom wall a centrally located feed aperture, and means for feeding potatoes to said aperture alternately from opposite sides of said box and under control of said wheel, and driving connections between one of the frame wheels and said planting wheel adapted to be rendered effective and ineffective by adjustment of said second frame.

HENRY BROOKS.